United States Patent [19]
Gibson et al.

[11] 3,760,175
[45] Sept. 18, 1973

[54] UNCOOLED GALLIUM-ALUMINUM-ARSENIDE LASER ILLUMINATOR

[75] Inventors: Steve B. Gibson, Manassas; William B. Lyttle, Fairfax; Andy J. Repasy, Alexandria, all of Va.

[73] Assignee: The United States of America as represented by the Secretary of the Army, Washington, D.C.

[22] Filed: Sept. 22, 1972

[21] Appl. No.: 291,521

[52] U.S. Cl. ........ 240/1 EL, 240/41 R, 331/94.5 P, 350/96 B
[51] Int. Cl. .................................................. F21v
[58] Field of Search .................... 240/1 EL, 41 R; 350/96 R, 96 B; 331/94.5 P, 94.5 PE

[56] References Cited
UNITED STATES PATENTS

| 3,284,722 | 11/1966 | Gray | 331/94.5 P |
| 3,538,455 | 11/1970 | Florio | 331/94.5 PE |
| 3,555,452 | 1/1971 | Nielsen et al. | 331/94.5 P |

*Primary Examiner*—Richard L. Moses
*Attorney*—Harry M. Saragovitz et al.

[57] ABSTRACT

A compact room temperature laser illuminator is provided. A cylindrical design allowing both radial and axial power and heat flow is employed. A stepped heat sink provides adequate cooling for close packed diodes. Shape and placement of electronic and optical elements as well as their composition materials are combined to insure unusually high reliability, small size, and low weight.

9 Claims, 9 Drawing Figures

PATENTED SEP 18 1973
3,760,175
SHEET 1 OF 5
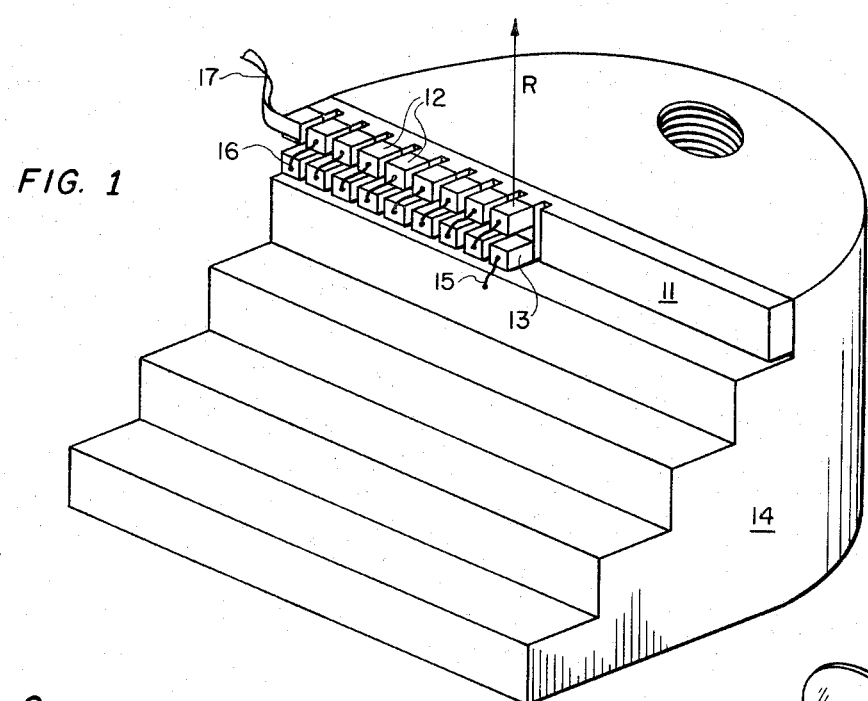
FIG. 1
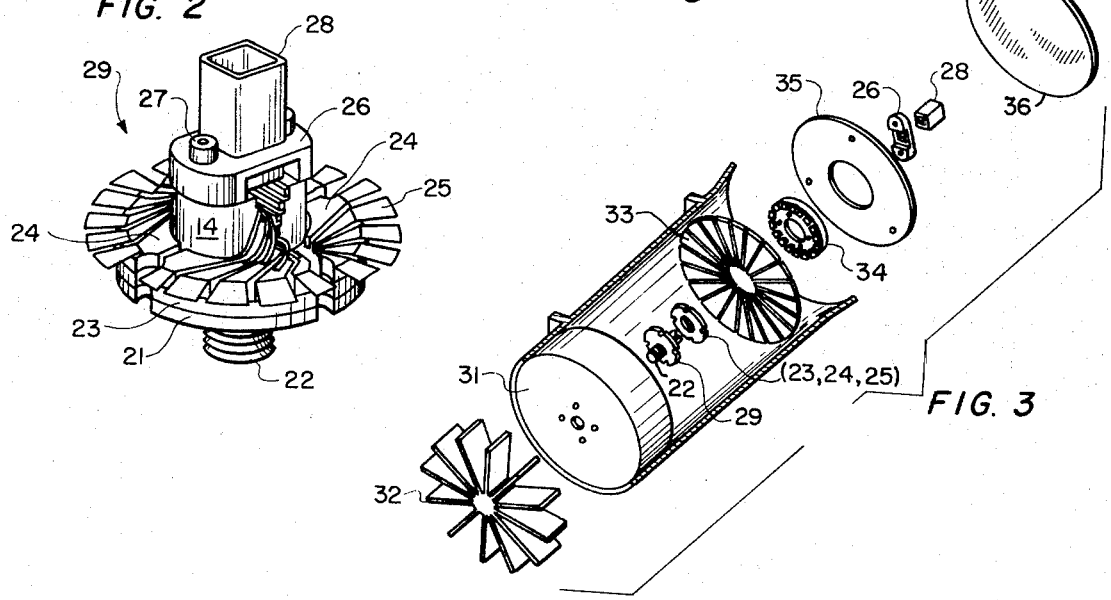
FIG. 2
FIG. 3
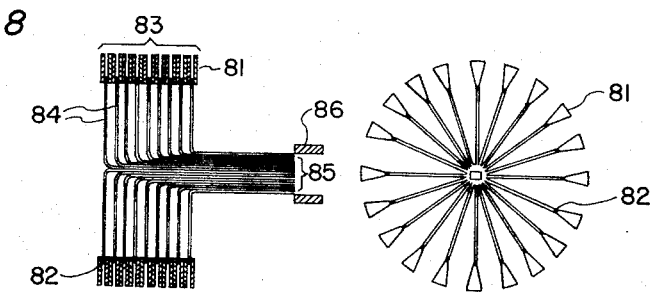
FIG. 8
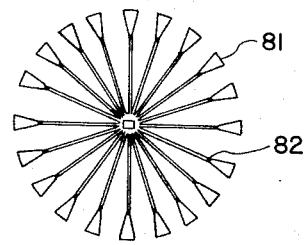
FIG. 9

3,760,175

UNCOOLED GALLIUM-ALUMINUM-ARSENIDE LASER ILLUMINATOR

The invention described herein may be manufactured, used and licensed by or for the Government for governmental purposes without the payment to us for royalty thereon.

BACKGROUND

Lasers are popular elements for use in rangefinders. Their optical frequencies permit extremely narrow pulses and narrow beams. The concentration of radiated power within a very small bandwidth permits the use of highly discriminating detectors which work well even at high ambient light levels, i.e., daylight. Diodes are preferred because of their simplicity and small size. To obtain sufficient illumination from such diodes they are usually arranged and mounted on a single heat sink. This works well for lasers that operate at extremely low temperatures and employ refrigeration systems coupled to the heat sink. Room temperature lasers are difficult to construct in this fashion because the heat flow from adjacent diodes may produce high temperature gradients before the heat can be dissipated into the sink. If the diodes are greatly separated to avoid this, sophisticated optics must be employed to restore the beam intensity. The illuminator then tends to grow bulky and heavy.

SUMMARY OF THE INVENTION

The purpose of the present invention is to provide a lightweight laser illuminator with a large number of arrayed diodes that operates efficiently in a continuously pulsed mode at near ambient temperatures. To achieve this 180 diodes are mounted symmetrically in substantially close packed relationships to achieve a square array normal to the axis of radiation. The diodes are displaced in groups along the axis to provide more efficient coupling to a heat sink. The heat sink, which comprises a number of elements, is roughly a thick disc forming one end of an otherwise thin walled cylindrical housing of the illuminator. The timer and other circuitry to drive the diodes is roughly toroidal in shape so as to hug the housing wall adjacent to the heat sink leaving the space near the optic axis free for optical components and their associated radiation beam. The optical elements aside from the diodes themselves consist of a light pipe integrator and a plastic lens, the latter forming the circular wall of the illuminator housing opposite the heat sink.

BRIEF DESCRIPTION OF THE DRAWINGS

The invention is best understood with reference to the following drawings wherein:

FIG. 1 shows a half of the diode array unit with its threades stem portion, most of the diodes, and their electrical interconnections removed for clarity.

FIG. 2 shows an assembled array unit including its mounting stem electrical commutator, and integrating light tube, FIG. 3 shows an exploded view of the entire illuminator showing major subassemblies.

FIGS. 8 and 9 show a side and top view of an alternate embodiment of the array unit shown in FIG. 2.

DESCRIPTION OF THE INVENTION

Figure 4:
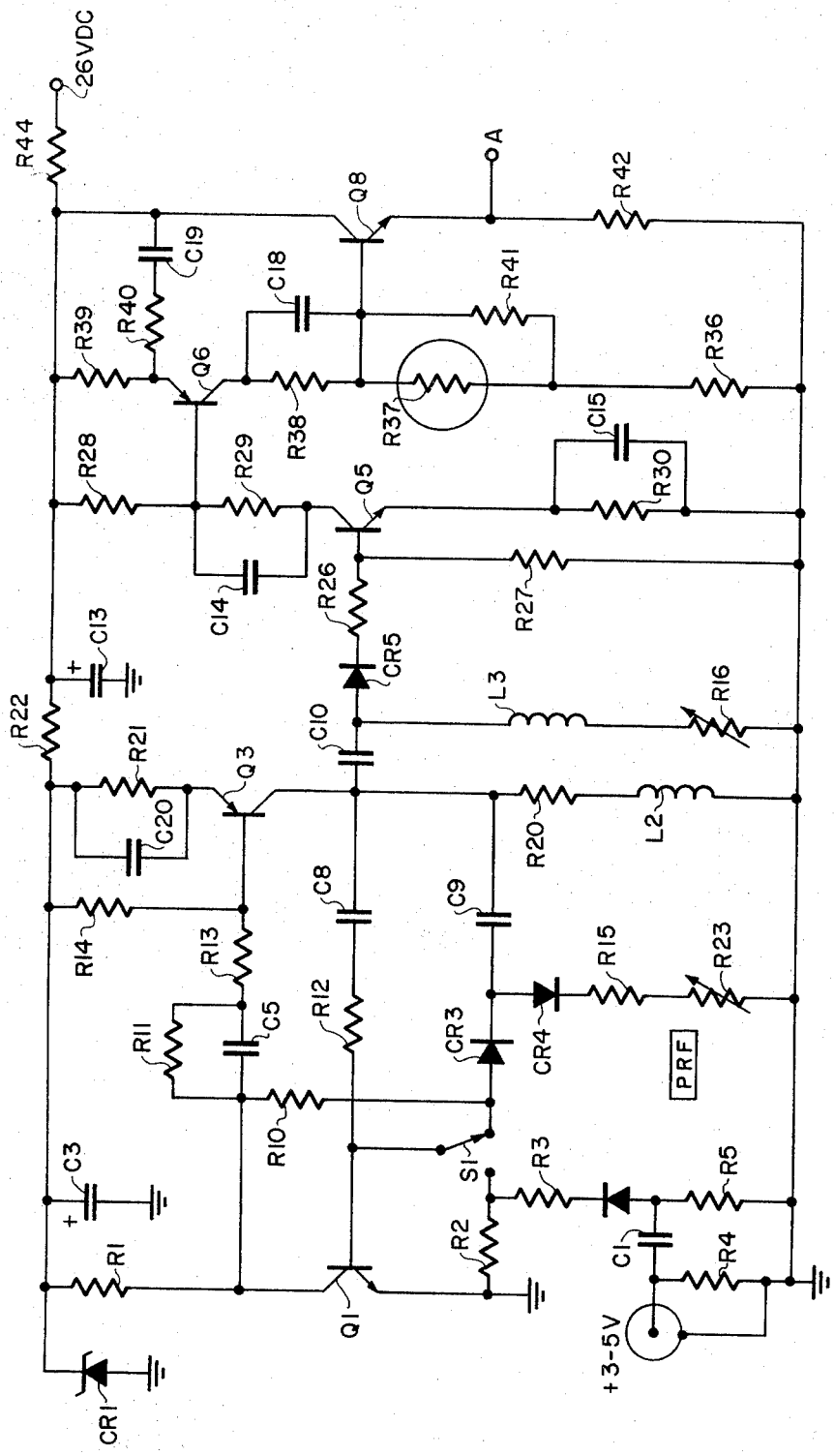
FIG. 4 shows a diagram of the pulse timing circuits used to drive the array.

Referring specifically to FIG. 1 there is shown one half of one embodiment of the diode array unit 29 with a majority of the components removed for clarity. The diodes are formed from a continuous gallium-aluminum arsenide strip diode which is soldered to a sheet 11 of beryllium oxide with opposed surfaces copper clad. Individual diodes 12 are electrically separated by sawing through the strip diode and the copper cladding on the adjoining side of the beryllium oxide insulation sheet. In similar fashion a copper strip is soldered to the same face of sheet 11 and separated into a number of terminal blocks 13 each electrically connected to one terminal of a single diode via the copper cladding. The resulting structure, which actually includes twice the number of diodes shown and extends the full length of the sheet 11, is soldered to the riser face of one step provided on the head 14 of a copper half bolt. The above and similar structures are attached to all of five riser faces provided on the half-bolt. The p-layers of the center diodes are soldered directly to the half bolt using gold wire 15. Similar wires 16 link the n and p layers of adjacent diodes which lie between the center and any one end of a row to form a nine diode port which radiates in the direction R. The remaining n-layer at each end is connected to a ribbon conductor 17 which may be copper, gold or other convenient conducting material. Five steps are thus provided each holding eighteen diodes. Two such half bolts fit together to form a single array unit 29 of 180 diodes. The stepped configuration results in little or no diode separation normal to the axis of radiation. The parallel displacement facilitates the head sinking of all diodes and does so with a minimum interference of thermal flow between them. The tread width of the steps and similar dimensions of elements adjacent thereto have been greatly exaggerated for clarity.

FIG. 2 shows a complete array unit 29 formed from two half bolts. In addition to the head shown in FIG. 1 each half bolt has a grooved flange portion 21 and half of a threaded stem 22. A copper clad layer of pc board 23 is soldered to the upper surface of the flange. Individual copper commutator segments 24 are provided on the upper face of the pc layer by soldering half of a thin copper washer thereto spaced from the head portion 14 and chemically etching the grooves which separate the segments. The segments taper radially inward, thus creating an outward heat gradient. An externally projecting copper leaf contact 25 which also tapers inwardly is attached to each segment. Twenty segments are provided and the ribbon conductor 17 (see FIG. 1) from each port is connected to different segment. The two half bolts are interconnected by the light integrator housing 26 using two screws 27. The light integrator 28 which consists of a plastic tube mirrored on the inside to provide a waveguide is cemented to the housing. The end of the integrator nearest the diodes has a square inside cross section one fourth inch on a side to correspond to the dimensions of diode array. It tapers over a length of six tenths of an inch to an inside dimension of one tenth by fifteen hundredths of an inch. The resulting light image is smaller and more uniformly illuminated than image presented by the diodes alone.

FIG. 3 shows the complete illuminator in exploded view. The stem 22 of the array unit 29 just described is inserted through the center hole of a massive backing plate 31 of copper, aluminum or similar good conductor of heat and electricity. A set of cooling fins 32 radiating from an internally threaded hub engages the threaded portion of the stem to provide firm contact and easy disassembly of these three elements. Although the commutator is shown below the pie-shaped wedges 33 that make up the pulser substrate, its contact leaves 25 project over the narrow ends of the latter which in turn are soldered directly to the back plate. The annular metal pressure plate 34 which includes twenty pads of rubber or the like cemented to its lower face one above each leaf contact is mounted in place by four screws (not shown) which project through the grooves in the flanges of the two half bolts and engage threaded apertures provided in the back plate. The pads force the commutator leaves into firm contact with the pulse substrate wedges. The gaps are provided between the commutator segments are sufficiently wide to admit the pressure plate screws. Like the commutator the integrator housing and integrator are mounted on the half bolts as previously described. The remaining electronic components are mounted on annular insulating boards 35 like to one shown. A number of such boards are normally arranged about the central optic axis separate from one another and the back by sleeve type spacers on three mounting screws which engage thread holes on the inside surface of the backing plate 31. The central aperture of the insulating boards is sufficiently large to pass the pressure plate and diode array unit 29 for easy disassembly. A cylindrical housing surrounds the electrical components and engages, with a sliding fit, the edge of the back plate. Set screws (not shown) are threaded through the housing wall to prevent the back plate from sliding out of housing. Grooves may be provided in the back plate so that it can partially slide over the screws before engaging them as it becomes flush with the rear edge of the housing. The lens 36 is screwed in place with conventional ring mountings which threadably engage the front end of the housing. Focussing is accomplished by sliding the back plate forward or backward.

FIG. 4 shows the pulse timing circuit for the illuminator. The circuit is designed to operate in conjunction with a gated detector having a pulse repetition frequency of 650 hertz and a pulse width of one microsecond. To reduce heating problems the illuminator uses two pulses during each gate period of the detector each pulse having a width of 150 nanoseconds. The pulse repetition frequency (PRF) is set by adjustment of R23 and the pulse width is adjusted by R16. Throwing switch 1 permits external synchronization.

Figure 5:
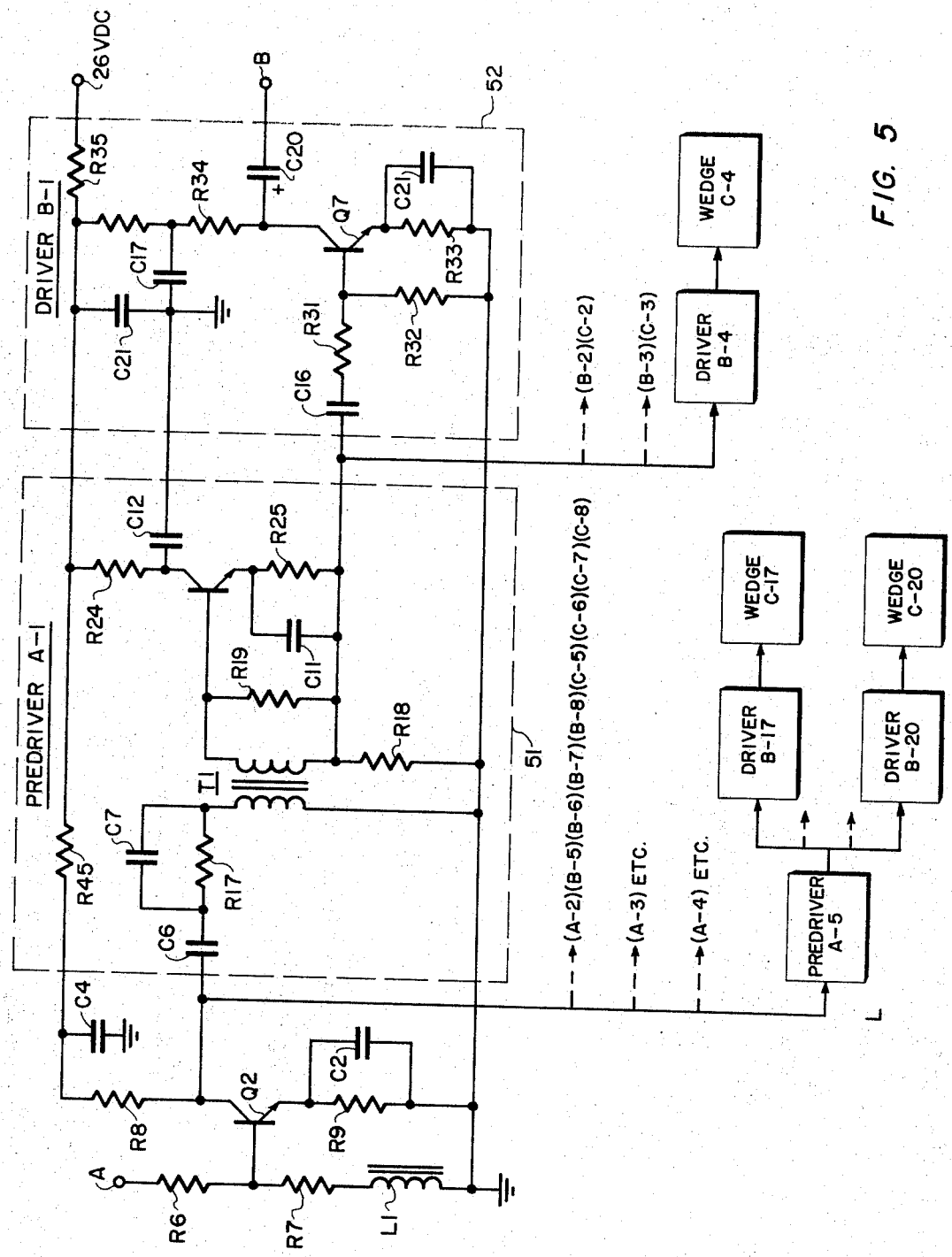
FIG. 5 shows a diagram of the drive pulse forming circuits.

FIG. 5 shows the pulse shaping circuits which drive the diode array. Terminal A connects to the corresponding terminal of the pulse timing circuit. The resulting pulses are fanned out to the diodes through five predrivers each of which operates four drivers. Examples of the circuits used in the predrivers and drivers are shown within the dashed boxes 51 and 52 respectively. One annular circuit board is provided for the predrivers and antoher for the drivers. The same 26 V power supply used for the timing circuits can be used with the predrivers and drivers. The outputs of the drivers are coupled to separate wedges in the pulser substrate.

Figure 6:
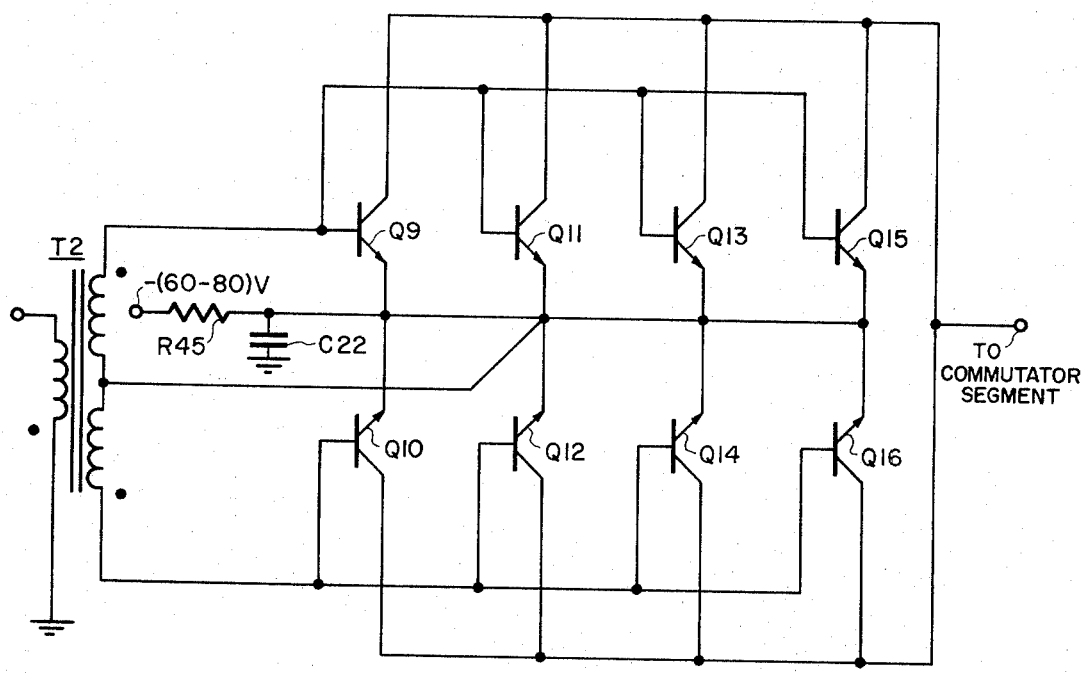
FIG. 6 shows a circuit diagram of a pulser substrate wedge.

FIG. 6 shows the pulser circuit diagram for one wedge. Table I describes the components in all of the aforementioned circuits. An external source of 60 to 80 volts negative is needed for the wedges. A voltage converter on a separate annular circuit board 35 as shown in FIG. 3 may be included to match the unit to any available source of power. As long as solid state components are used the heat dissapation will not materially affect the well-sinked diodes of the array.

Figure 7:
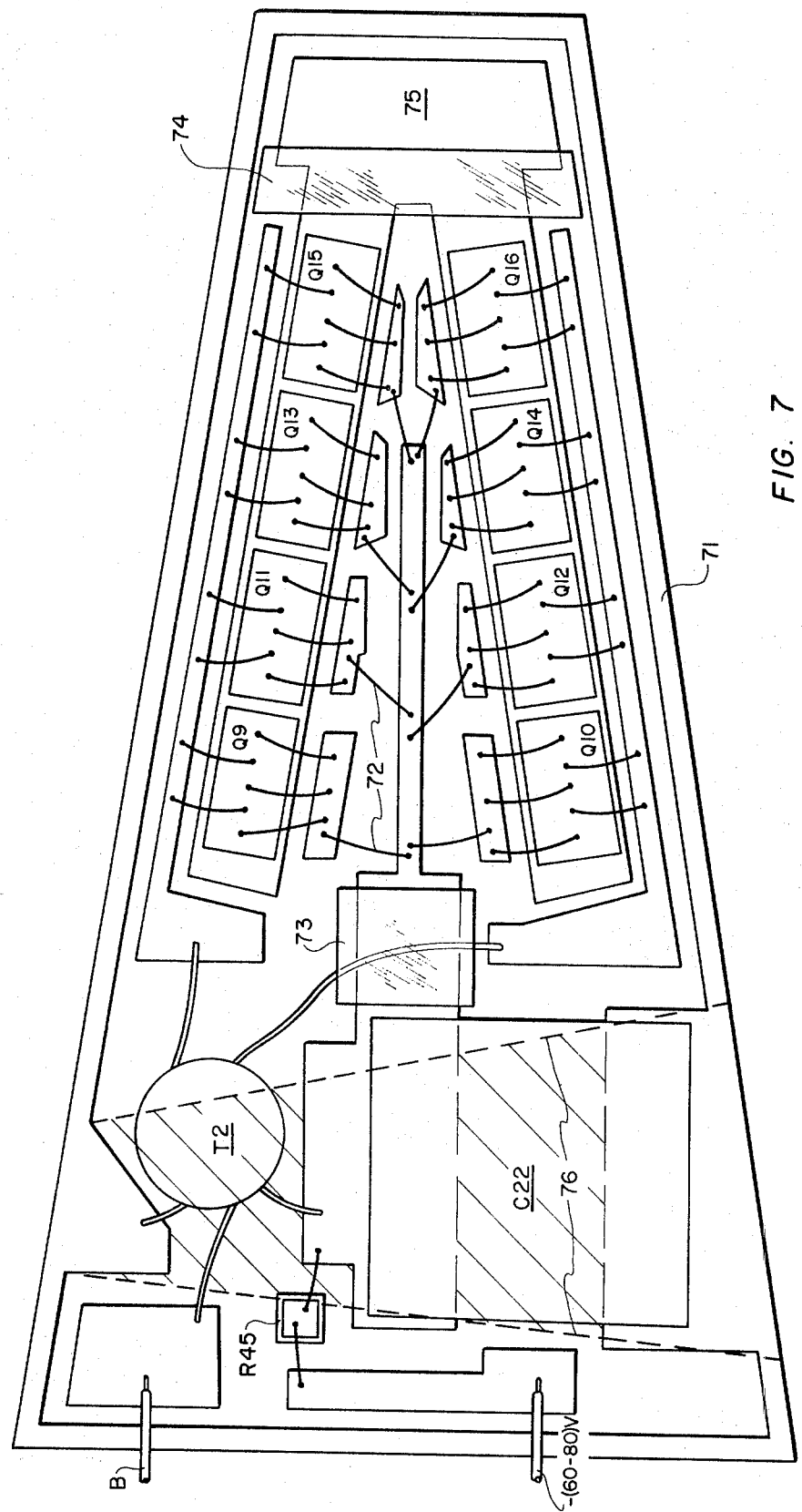
FIG. 7 shows the physical configuration of a pulser substrate wedge.

FIG. 7 shows the physical appearance of one wedge of the pulser substrate. The substrate material is a ceramic insulator approximately twenty five mils thick. Metallized terminals e.g., terminal 71 and other darkened areas of this figure, are deposited as shown using platinum gold and gold in subsequent layers. The transistors Q9–Q16 and resistors R45 are die-bonded to the separate terminals as shown. The capacitors C22 are cemented in place with conductive silver epoxy. Transformer T 1 is cemented with normal epoxy to the bare substrate. Gold interconnecting wires such as 72 are bonded between components to complete the electrical circuits. Thin glass overlay 73 is an insulating bridge for one lead of transformer T2 and 74 is provided to protect the transistors Q9–Q16 from solder flow in the event that the leaf conductors 25 from FIG. 2 are thus connected to collector terminal 75. In the region of capacitor 22 ground terminal 71 extends around the edges of the substrate to the backside to permit a conductive bond with the backing plate 31 (see FIG. 3).

FIGS. 8 and 9 show a side and top view of an alternate embodiment of the array unit, pc board, commutation segments, and leaf contacts shown in FIG. 2. A series of triangular mounts 81 of copper on other conducting material are arranged in a flat annular ring symmetrical and normal to the axis of radiation, similar to that formed by the leaf elements 25 of FIG. 2. The dimensions of the mounts are not critical but are made as large as the physical constraints of the system will permit to obtain minimum inductance and maximum heat sinking. The mounts are arrayed vertically in pairs with a light emitting diode 82 sandwiched between each pair. The diodes are located near the small apex angle (approx. 18°) for a 20 port array) of the triangular mounts. Nine pairs are stacked vertically to form a port 83 analogous to those described in FIG. 1. The radiating face of each diode is approximately perpendicular to a normal from the optical axis of the illumination. An optical fiber 84 comprising nine one mil square component fibers drawn together has one end abutted to the one by nine mil radiating face of each diode. The opposite ends 85 of the one hundred and eighty fibers radiating from the ports are brought to the optical axis and collected in a plane at one end of an optical integrator 86 similar to that shown in FIGS. 2 and 3. The space between the mounts may be filled with dielectric, but it is preferred to leave as much of the surface area exposed to the atmosphere as possible. A substantial portion of

TABLE I

RESISTORS

¼W—10% Unless Otherwise Specified

R1 — 10,000
R2 — 10,000
R3 — 1,000

R24 — 100
R25 — 2 (5%) (Non Ind)
R26 — 300 (5%)

R4 —68
R5 — 10,000
R6 —33 (5%)
R7 —15 (5%)
R8 —100
R9 —2 (5%) (Non Ind.)
R10 — 500,000 (1%)
R11 — 51,000 (1%)
R12 — 3,300 (1%)
R13 —300 (1%)
R14 — 5,100 (1%)
R15 —100 (1%)
R16 — 2,500 (Wire)
R17 —10 (5%)
R18 —100 (1%)
R19 —22 (5%)
R20 —100
R21 —100 (1%)
R22 — 1,000
R23 — 1,000 (Wire)
R27 — 68 (5%)
R28 — 47 (5%)
R29 — 100 (5%)
R30 — 22 (5%)
R31 — 22 (5%)
R32 — 22 (5%)
R33 — 2 (5%)
R34 — 100 (5%)
R35 — 100 (5%)
R36 — 68 (5%)
R37 — 100 (5%)
R38 — 100 (5%)
R39 — 47 (5%)
R40 — 47 (5%)
R41 — 150 (5%)
R42 — 68 (5%)
R43 — 10
R44 — 470
R45 — 10

CAPACITORS (Microfarods)
C1 — 0.470
C2 — 0.003
C3 — 6.800
C4 — 0.100
C5 — 820.0 (1%)
C6 — 0.220 (5%)
C7 — 0.001 (5%)
C8 — 0.0002
C9 — 0.010 (1%)
C10 — 0.0022(1%)
C11 — 0.010 (5%)
C12 — 0.100
C13 — 6.800
C14 — 0.001 (5%)
C15 — 0.001 (5%)
C16 — 0.100
C17 — 0.100
C18 — 0.001 (5%)
C19 — 0.010 (5%)
C20 — 1.000
C21 — 0.010 (5%)
C22 — 2.000

TRANSFORMERS
T1 — 2:1
T2 — 3:1

TRANSISTORS
Q1 — 2N22224
Q2 — 2N3262
Q3 — 2N2907
Q4 — K56117
Q5 — 2N2222A
Q6 — 2N2907
Q7 — K56117
Q8 — 2N2222A
Q9 — K56117
Q10 — K56117
Q11 — K56117
Q12 — K56117
Q13 — K56117
Q14 — K56117
Q15 — K56117
Q16 — K56117

DIODES
CR1 — 1N4114
CR2 — 1N916
CR3 — 1N916
CR4 — 1N916
CR5 — 1N916

INDUCTORS (Microhenries)
L1 — 0.5
L2 — 10.0
L3 — 1.0 the entire unit can be potted or individual parts coupled with conducting or non-conducting epoxy cements. The uppermost and lowermost triangular faces in each port are left exposed for electrical connection. The lowermost faces rest against or are soldered to the collector contact at the tip of each pulse wedge. The uppermost face contacts the pressure plate (the rubber pads having been omitted or replaced with conductive spring contacts). The screws that mount the pressure plate extend between the radiating fibers to the back plate provide a ground return. All circuits are grounded to the back plate and access is provided at any convenient point through the housing to an external power source as in the embodiment of FIGS. 1–3.

The fiber optic arrangement results in a reduction of the overall electrical impedance, better heat sinking, elimination of the need for double pulsing, a reduction in the size of the image source and reduction in the lens diameter and focal length requirement by a factor of at least two. For the same configuration the fiber optic embodiment gave nearly four times the light output. The array of FIGS. 1–3 retains the advantages of greater ease of fabrication and lower cost.

The completed illuminator is nine inches long and 4.1 inches in diameter. With the array of the FIGS. 1–3 embodiment it has an average power output of 80 milliwatts with a peak output of 410 watts. An effective PRF of 1300 HZ with an effective duty cycle of $1.95 \times 10^{-4}$ was achieved by double pulsing. The radiation was centered at 850 nanometers ($\pm 5.18$). The output beam angle is less than 2°. The total system efficiency is better than 53 percent.

Obviously numerous variation of the above described structures will occur to those skilled in the art but the invention is not to be limited except as defined in the claim which follow.

We claim:
1. In a laser illuminator,
   a substantially cylindrical hollow housing member having first and second opposed open ends;
   a solid cylindrical backing plate of electrical and heat conducting material slidably mounted in the first of said open ends;
   a series of annular electrical driving circuits located within said housing having means to couple to an external source of power and having a central aperture;
   a series of high power transistorized pulse forming circuits mounted on thin wedge shaped ceramic substrates which are mounted on said backing plate to form an annular segmented ring electrically coupled to said driving circuits;
   an array member having a ground terminal electrically connected to said backing plate and a plurality of port terminals each electrically contacting a different one of said pulse forming circuits at the point of its wedge;
   a plurality of light emitting diodes mounted on said array member and separated into ports having a substantially equal number of diodes electrically connected in series between each of said port terminals and said ground terminal;
   and optical means mounted on said housing to focus the light images of said light emitting diodes into a narrow substantially uniformly illuminated beam.

2. A laser illuminator according to claim 1 wherein said electrical driving circuits include means to supply a plurality of pulses in less than one microsecond repeated continuously at a frequency under one kilocycle to increase the effective duty cycle of the illuminator without adverse heating effects.

3. A laser illuminator according to claim 1 wherein, said array member includes a central bolt-like member of conducting material with a stepped head portion to receive said plurality of light emitting diodes with a threaded stem portion extending through said backing plate;
   and a finned nut-like member is threadably attached to the external portion of said stem.

4. A laser illuminator according to claim 3 wherein said bolt-like member further includes,
   a commutator flange adjacent said stepped head portion;
   an insulator mounted on said flange;
   and a plurality of electrically conducting commutator segments mounted on said insulator, each segment being attenuated in cross section as it approaches said head portion and each segment being electrically connected in series between said diodes and said port terminals with its smallest cross-section connected directly to said diodes.

5. A laser illuminator according to claim 1 wherein said array member includes,
   a plurality of ports each comprising a stack of triangular shaped conductive mounts stacked in pairs;
   a diode sandwiched between each pair at the smallest angle of said mounts each stack resting on the circuit at the tip of one of said wedge shaped substrates a conductive pressure plate resting on the opposite and of said stack;

conductive fastening means connections said pressure plate to said backing plate;

and said optical means includes a separate means for redirecting the radiation from each diode into a single narrow beam along the axis of said cylindrical housing.

6. A laser illuminator according to claim 5 wherein, said separate means consists of a plurality of optical fibers each cemented to the radiation face of a different diode.

7. A laser illuminator according to claim 1 wherein, said optical means includes a wave guide integrator mounted on said array member and a lens covering the second of said open ends in said housing member.

8. A laser illuminator according to claim 4 wherein, said optical means includes a wave guide integrator mounted on said array member and a lens covering the second of said open ends in said housing member.

9. A laser illuminator according to claim 6 wherein, said optical means includes a wave guide integrator mounted on said array member and a lens covering the second of said open ends in said housing member.

* * * * *